United States Patent
Wehmeier et al.

(10) Patent No.: US 10,794,311 B2
(45) Date of Patent: Oct. 6, 2020

(54) METHOD FOR ADJUSTING A FUEL/AIR RATIO OF AN INTERNAL COMBUSTION ENGINE

(71) Applicant: Robert Bosch GmbH, Stuttgart (DE)

(72) Inventors: Kersten Wehmeier, Ludwigsburg (DE); Michael Pfeil, Marbach am Neckar (DE); Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/347,986

(22) PCT Filed: Oct. 26, 2017

(86) PCT No.: PCT/EP2017/077478
§ 371 (c)(1),
(2) Date: May 7, 2019

(87) PCT Pub. No.: WO2018/086906
PCT Pub. Date: May 17, 2018

(65) Prior Publication Data
US 2019/0257259 A1    Aug. 22, 2019

(30) Foreign Application Priority Data
Nov. 10, 2016 (DE) .................. 10 2016 222 108

(51) Int. Cl.
*F01N 3/00* (2006.01)
*F02D 41/02* (2006.01)
*F02D 41/14* (2006.01)

(52) U.S. Cl.
CPC ..... *F02D 41/0295* (2013.01); *F02D 41/0235* (2013.01); *F02D 41/1441* (2013.01);
(Continued)

(58) Field of Classification Search
CPC ............ F02D 41/0235; F02D 41/0295; F02D 41/1454; F02D 41/1441
(Continued)

(56) References Cited

U.S. PATENT DOCUMENTS

2002/0152743 A1* 10/2002 Nakamura ............. F01N 3/101
60/285
2003/0017603 A1* 1/2003 Uchida ............... F02D 41/1408
436/37

(Continued)

FOREIGN PATENT DOCUMENTS

DE    19606652    8/1997
DE    10232385    8/2003

(Continued)

OTHER PUBLICATIONS

International Search Report for Application No. PCT/EP2017/077478 dated Jan. 31, 2018 (English Translation, 2 pages).

*Primary Examiner* — Jason D Shanske
(74) *Attorney, Agent, or Firm* — Michael Best & Friedrich LLP (57) ABSTRACT

The invention relates to a method for adjusting a fuel/air ratio of an internal combustion engine (10), comprising a catalyst volume (26) with a first catalyst partial volume (26.1) and a second catalyst partial volume (26.2). The second catalyst partial volume (26.2) is arranged downstream from the first catalyst partial volume (26.1). An actual filling level of an exhaust gas constituent in the catalyst volume (26) is calculated from operating parameters of the internal combustion engine (10) and the exhaust system (14) using a computing model, and is adjusted to a nominal value by modifying the fuel/air ratio. The adjustment is carried out first for the second catalyst partial volume (26.2) and only later for the first catalyst partial volume (26.1).

14 Claims, 3 Drawing Sheets

(52) U.S. Cl.
CPC .. *F02D 41/1454* (2013.01); *F02D 2041/1433* (2013.01); *F02D 2200/0814* (2013.01); *F02D 2200/0816* (2013.01)

(58) Field of Classification Search
USPC .......................................................... 60/285
See application file for complete search history.

(56) References Cited

U.S. PATENT DOCUMENTS

| | | | | |
|---|---|---|---|---|
| 2004/0045282 | A1* | 3/2004 | Ide | F01N 3/101 60/285 |
| 2006/0272316 | A1* | 12/2006 | Miyashita | B01D 53/9431 60/282 |
| 2012/0040824 | A1* | 2/2012 | Itou | B01J 35/0006 502/339 |

FOREIGN PATENT DOCUMENTS

| | | |
|---|---|---|
| DE | 10339063 | 2/2005 |
| DE | 60121834 | 11/2006 |

\* cited by examiner

METHOD FOR ADJUSTING A FUEL/AIR RATIO OF AN INTERNAL COMBUSTION ENGINE

BACKGROUND OF THE INVENTION

The present invention relates to a method for adjusting a fuel/air ratio of an internal combustion engine which has an exhaust gas system with a catalyst volume which is capable of storing an exhaust gas component. In its device aspects, the present invention relates to a control device.

Such a method and such a control device are known in each case from DE 103 39 063 A1. In the case of the known method, the exhaust gas component is oxygen. An actual fill level of this exhaust gas component in the catalyst volume is calculated from operating parameters of the internal combustion engine and of the exhaust gas system with a calculation model and adjustment of the fuel/air ratio is carried out as a function of a deviation of the actual fill level from a predetermined setpoint fill level. Such a method and such a control device are furthermore also known from DE 196 06 652 A1 of the applicant.

A calculation method refers here to an algorithm which links input variables, which also act on the real object reproduced with the calculation model, to output variables so that the calculated output variables correspond to the output variables of the real object as precisely as possible. In the case under consideration, the real object is the total physical distance which lies between the input variables and the output variables, which can be, for example, a catalyst or an internal combustion engine with a catalyst.

In the event of incomplete burning of the fuel/air mixture in a petrol engine, in addition to nitrogen ($N_2$), carbon dioxide ($CO_2$) and water ($H_2O$), a plurality of combustion products are emitted, of which hydrocarbons (HC), carbon monoxide (CO) and nitrogen oxides ($NO_X$) are legally limited. The current exhaust gas thresholds for motor vehicles can, according to the current prior art, only be adhered to with a catalytic exhaust gas after-treatment. By using a three-way catalyst, the stated pollutant components can be converted into nitrogen, carbon dioxide and water.

A simultaneously high conversion rate for HC, CO and $NO_X$ is achieved in the case of three-way catalysts only in a narrow lambda range around the stoichiometric operating point (lambda=1), what is known as the conversion window. A lambda control is typically used in current engine control systems for operation of the catalyst in the conversion window, which lambda control is based on the signals from lambda probes in front of and behind the catalyst. The oxygen content of the exhaust gas in front of the catalyst is measured with the lambda sensor for control of the lambda in front of the catalyst. As a function of this measurement value, the control corrects the quantity of fuel from the pilot control. In the context of pilot control, basic values of quantities of fuel to be injected are predefined as a function of, for example, rotational speed and load of the internal combustion engine. The oxygen content of the exhaust gas behind the catalyst is additionally detected with a further lambda sensor for more precise control. The signal of this lambda sensor is used for guidance control which is superimposed on the lambda control in front of the catalyst. A switching-type lambda sensor is generally used as the lambda sensor arranged behind the catalyst, which switching-type lambda sensor possesses a very steep characteristic curve at lambda=1 and therefore can display lambda=1 very precisely (Kraftfahrtechnisches Taschenbuch, $23^{rd}$ Edition, Page 524).

In addition to guidance control which generally only adjusts for very small deviations from lambda=1 and operates comparatively slowly, in current engine control systems, there is generally a functionality which, after large deviations from lambda=1, in the form of a lambda pilot control ensures that the conversion window can be reached again rapidly, e.g. after phases with propulsion operation deactivation ("catalyst clearing").

Due to the oxygen storage capacity of the three-way catalyst, lambda=1 can still be present for several seconds behind the catalyst, a rich or lean lambda was subsequently adjusted in front of the catalyst. This property of the catalyst of temporarily storing oxygen is used to balance out brief deviations from lambda=1 in front of the catalyst. If, in front of the catalyst, lambda is not equal to 1 over a longer period of time, the same lambda will also arise behind the catalyst as soon as its oxygen storage capacity is exceeded. At this point in time, a switching-type lambda sensor also displays a departure from the conversion window behind the catalyst. Up until this point in time, the signal of lambda sensor behind the catalyst does not nevertheless indicate the imminent breakthrough and a guidance control based on this signal thus only reacts so late that the metering of fuel can no longer react in a timely manner prior to a breakthrough. Increased tail pipe emissions occur as a result. Current control concepts therefore have the disadvantage that they only later detect a departure from the conversion window on the basis of the switching-type lambda sensor behind the catalyst.

An alternative for control of the three-way catalyst on the basis of the signal of a lambda sensor arranged behind the catalyst is control of the average oxygen fill level of the catalyst. This average fill level cannot be measured, but can be modeled according to DE 103 39 063 A1 stated above by calculations.

It has been shown that in particular a three-way catalyst is an object which is not easy to model with non-linear characteristics and model parameters which vary over time. The modeled average fill level therefore reflects both the exhaust gas composition at the outlet of the catalyst which is relevant for the arising emissions and the fill level reserve which is available for reactions to dynamic disturbances for output and absorption of oxygen only to a limited extent. In terms of an output of oxygen, the fill level reserve is the oxygen quantity stored in the catalyst. In terms of an absorption of oxygen, the fill level reserve is the quantity of oxygen which the catalyst can still absorb.

SUMMARY OF THE INVENTION

In the case of the invention, a first actual fill level of the exhaust gas component for a first catalyst partial volume is calculated with the calculation model and a second actual fill level of the exhaust gas component is calculated for a second catalyst partial volume. In this case, the second catalyst partial volume lies downstream of the first catalyst partial volume in the exhaust gas flow of the internal combustion engine. The adjustment of the fuel/air ratio is initially carried out as a function of a deviation of the second actual fill level from a second setpoint value and an adjustment of the fuel/air ratio is only carried out later as a function of a deviation of the first actual fill level from a first setpoint value.

The further explanations relate in particular to oxygen as an exhaust gas component and a three-way catalyst as a catalyst volume. However, this should not be viewed as a restriction to this combination. The catalyst can, for example, also be a $NO_X$ storage catalyst or an SCR catalyst and, for example, hydrocarbons or nitrogen oxides are also possible as exhaust gas components, without this list being meant to be final. The catalyst volume can also have several catalysts which lie behind one another in the flow path of the exhaust gas.

The invention enables in this context improved control of a quantity of oxygen stored in the catalyst volume with which a departure from the conversion window is detected at an early stage and prevented and which simultaneously has a more balanced out fill level reserve than existing control concepts against dynamic disturbances.

The invention is not restricted to the calculation of two actual values of a quantity of oxygen stored in the catalyst volume. More than two such actual values can also be calculated, wherein in each case an actual value relates to a catalyst partial volume. In the case of n partial volumes and correspondingly n actual values of a quantity of oxygen stored in the respective catalyst partial volume, an oxygen fill level profile which extends over the length of the catalyst volume is thus produced. The first catalyst is, in the case of this generalization, an nth catalyst partial volume and the second catalyst partial volume is, in the case of this generalization, an (n+1)th catalyst volume.

Adjustment of the fill level profile is carried out in the case of the invention so that minimal emissions at the outlet of the catalyst are achieved as a result of the oxygen fill level of the rear catalyst partial volume adjusted with higher priority and that, as a result of the subsequent adjustment of the oxygen fill level of the front catalyst partial volume, the fill level reserve with which the catalyst can buffer dynamic disturbances is increased. This fill level reserve is determined by the quantity of oxygen which can be released and by the quantity of oxygen which can be absorbed.

Consideration of the fill levels of at least two partial volumes of the catalyst has the advantage that an imminent departure from the conversion window can be detected earlier than in the case of guiding control based on the signal of an exhaust gas sensor arranged behind the catalyst and also earlier than in the case of control based on an average setpoint fill level of the entire catalyst.

As a result of this, departure from the conversion window can be counteracted by early targeted correction of the fuel/air mixture such that a breakthrough of fuel emissions can be avoided to a greater extent than in the case of the prior art. A reduction in tail pipe emissions is produced overall as a result of this. Stricter legal requirements can be satisfied with lower costs for the catalyst.

Both the objects of the guidance control described as known and also the objects of the function of the adjustment of a fill level reserve after a propulsion operation phase in which the catalyst was filled with oxygen up to its absorption limit or comparable objects are covered with the proposed concept. Adjustment of the fill level reserve or rapid reaching again of the conversion window after a propulsion operation phase and comparable functionalities only represent an adjustment of the oxygen fill levels of the catalyst with an initially larger control deviation than normal. This unified concept leads to simpler overall functionality which can be more easily adapted to different internal combustion engines and exhaust gas systems.

One preferred configuration is characterized in that the second setpoint value is predetermined such that the current emissions are minimized.

It is also preferred that the first setpoint value is predetermined so that a fill level reserve against changes in the fuel/air ratio which occur in front of the catalyst volume assumes a predetermined value.

It is further preferred that the second setpoint value is between 25% and 35% of the maximum oxygen storage capacity or the maximum fill level of the second catalyst partial volume. This is thus related to the fact that the demands on $NO_X$ conversion are stricter than the demands on HC conversion and CO conversion.

A further preferred configuration is characterized in that an exhaust gas temperature and an exhaust gas mass flow are taken into account in the calculation of the actual values of the fill levels.

It is further preferred that the catalyst volume is a three-way catalyst. It is also preferred that the catalyst volume has two individual three-way catalysts separated by a non-catalytic exhaust gas pipe portion lying between them, for example, a pre-catalyst and a main catalyst which lies downstream of the pre-catalyst.

A further preferred configuration is characterized in that the exhaust gas component is oxygen.

With a view to configurations of the control device, it is preferred that it is configured to control a procedure of a method according to one of the preferred configurations of the method.

Further advantages will become apparent from the description and the enclosed figures.

It will be obvious that the features mentioned above and still to be explained below can not only be used in the respectively indicated combination, but rather also in other combinations or on their own without departing from the scope of the present invention.

BRIEF DESCRIPTION OF THE DRAWINGS

Exemplary embodiments of the invention are represented in the drawings and explained in greater detail in the following description. The same reference numbers in different figures designate respectively identical elements or elements which are comparable at least in terms of their function. In each case in a schematic form, in the figures.

DETAILED DESCRIPTION

The invention is described below on the basis of the example of a three-way catalyst, but can also be expediently applied to other types of catalysts. For the sake of simplicity, an exhaust gas system with a single catalyst is assumed below. The invention can, however, expediently also be applied to exhaust gas systems with a plurality of catalysts. The front and rear catalyst partial volumes described below can in this case extend over a plurality of catalysts or lie in different catalysts.

Figure 1:
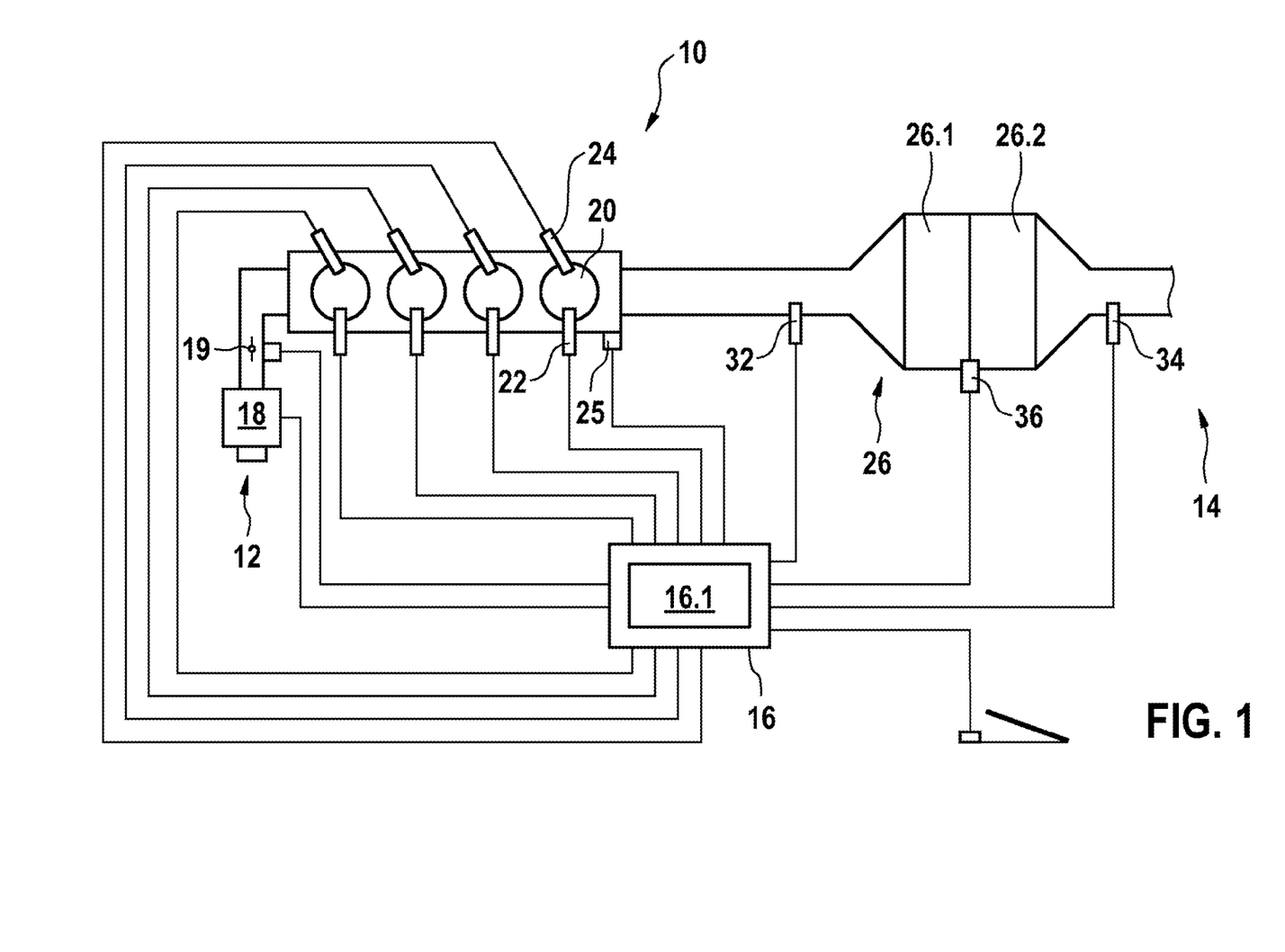
FIG. 1 shows an internal combustion engine with an exhaust gas system as a technical field of the invention.

In detail, FIG. 1 shows an internal combustion engine 10 with an air supply system 12, an exhaust gas system 14 and a control device 16. An air flow meter 18 and a throttle valve 19 arranged downstream of air flow meter 18 are located in air supply system 12. The air flowing via air supply system 12 into internal combustion engine 10 is mixed with petrol in combustion chambers 20 of internal combustion engine 10, which petrol is injected via injection valves 22 directly into combustion chambers 20. The resultant combustion chamber fillings are ignited and burned with ignition devices 24, for example, spark plugs. A rotational angle sensor 25 detects the rotational angle of a shaft of internal combustion engine 10 and allows control device 16 as a result to trigger ignitions at predetermined angle positions of the shaft. The exhaust gas resulting from the combustion processes is discharged by exhaust gas system 14.

Exhaust gas system 14 has a catalyst volume 26. Catalyst volume 26 is, for example, a three-way catalyst which, in a familiar manner on three reaction paths, converts the three exhaust gas components nitrogen oxides, hydrocarbons and carbon monoxide and possesses an oxygen-storing action. Catalyst volume 26 has, in the represented example, a first catalyst partial volume 26.1 and a second catalyst partial volume 26.2. Exhaust gas 28 flows through both catalyst partial volumes. First, front catalyst partial volume 26.1 extends in the direction of flow across a front region of three-way catalyst 26. Second, rear catalyst partial volume 26.2 extends downstream of first catalyst partial volume 26.1 across a rear region of catalyst volume 26. Naturally, further catalyst partial volumes can be present in front of front catalyst partial volume 26.1 and behind rear catalyst partial volume 26.2 as well as between both catalyst partial volumes, for which further catalyst partial volumes, where applicable, the respective fill level is also modeled.

A front exhaust gas sensor 32 exposed to exhaust gas 28 is arranged immediately in front of catalyst volume 26 upstream of catalyst volume 26. A rear exhaust gas sensor 34 also exposed to the exhaust gas is arranged immediately after catalyst volume 26 downstream of catalyst volume 26. Front exhaust gas sensor 32 is preferably a wide band lambda sensor which enables a measurement of air ratio $\lambda$ over a wide air ratio range. Rear exhaust gas sensor 34 is preferably what is known as a switching-type lambda sensor with which air ratio $\lambda=1$ can be measured particularly accurately because the signal of this exhaust gas sensor changes abruptly there. Cf. Bosch, Kraftfahrtechnisches Taschenbuch, $23^{rd}$ Edition, page 524.

In the represented exemplary embodiment, a temperature sensor 36 exposed to the exhaust gas is arranged in thermal contact with the exhaust gas on three-way catalyst 26 which detects the temperature of catalyst volume 26.

Control device 16 processes the signals of air flow meter 18, rotational angle sensor 25, front exhaust gas sensor 32, rear exhaust gas sensor 34 and temperature sensor 36 and forms from them actuation signals for adjusting the angle position of throttle valve 18, for triggering ignitions by ignition device 20 and for injection of fuel through injection valves 22. Alternatively or additionally, control device 16 also processes signals of other or further sensors for actuation of the represented actuators and also further or other actuators, for example, the signal of a driver command transmitter 40 which detects an accelerator pedal position. Propulsion operation with switching off of the fuel supply is triggered, for example, by releasing the accelerator pedal.

Figure 2:
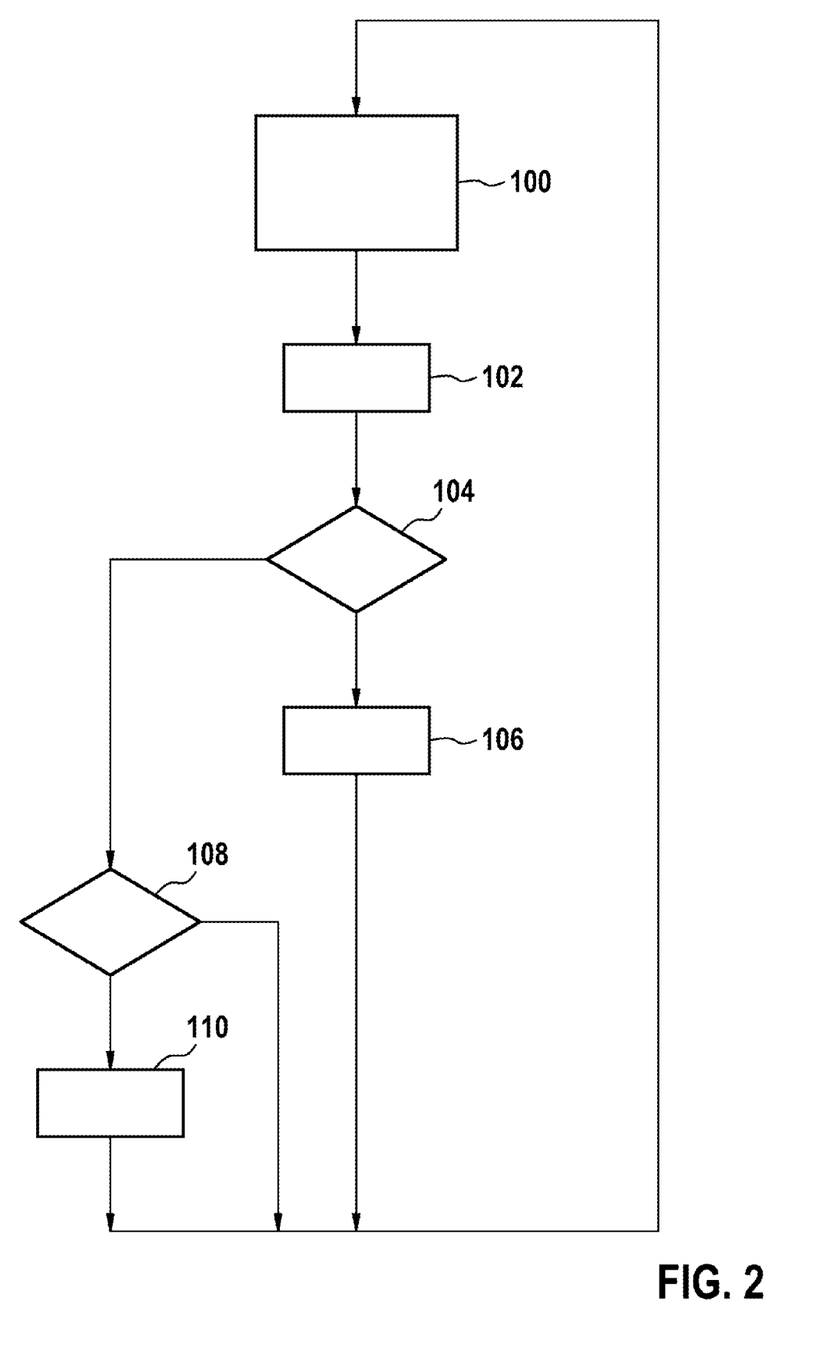
FIG. 2 shows a flow chart as an exemplary embodiment of a method according to the invention.
Figure 3A:
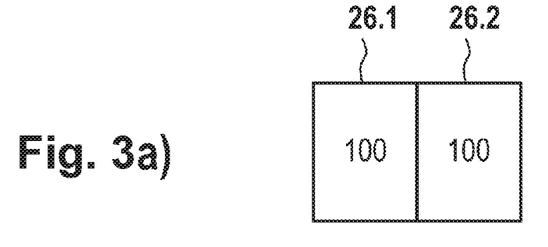
FIGS. 3a-e show in each case the fill level of two catalyst partial volumes in percent in the case of a control strategy with which the fill level in the second catalyst partial volume is initially adjusted.
Figure 3B:
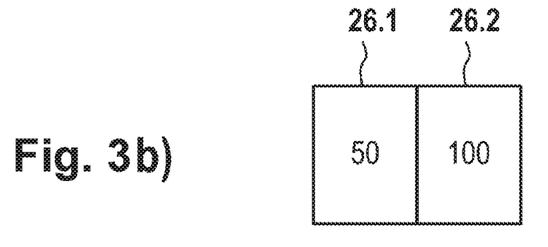
Figure 3C:
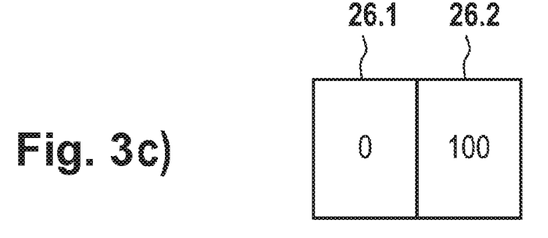
Figure 3D:
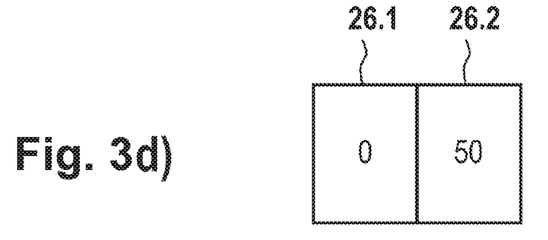
Figure 3E:
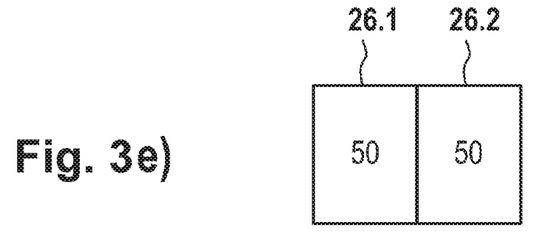

The flow chart of FIG. 2 shows an exemplary embodiment of a method according to the invention.

A block 100 represents a main program for control of internal combustion engine 10 in which, for example, throttle valve 19, ignition device 20 and injection valves 22 are actuated so that a desired torque is produced.

Since a fill level of a catalyst cannot be measured, the invention provides modeling of the fill levels, preferably oxygen fill levels, in at least two catalyst partial volumes 26.1, 26.2 of catalyst volume 26 with the aid of a calculation model 16.1. Calculation model 16.1 is a sub-program executed in control device 16.

This modeling is carried out in step 102 both for first catalyst partial volume 26.1 and also for second catalyst partial volume 26.2. The mass flow of excess oxygen and shortage of oxygen at the inlet of catalyst volume 26 is produced from the product of the signal of front exhaust gas sensor 32 which detects an oxygen concentration with the exhaust gas mass flow which is known in control device 16 from the measured air mass supplied to the internal combustion engine and the metered fuel for this purpose.

A predetermined fraction of this excess is stored in first catalyst partial volume 26.1 and a predetermined fraction of the shortage is compensated for by a reduction in the fill level of first catalyst partial volume 26.1. The predetermined fractions which can be different from one another are dependent on the temperature of catalyst volume 26, on the exhaust gas mass flow and on the fill level of first catalyst partial volume 26.1. The in each case complementary fractions represent input variables for the change in the fill level of second catalyst partial volume 26.2 and are thus also dependent on the exhaust gas mass flow and on the temperature of catalyst 26.

The fill level of second catalyst partial volume 26.2 is in particular dependent on the fill level of first catalyst partial volume 26.1. The greater the fill level of the first catalyst partial volume, the smaller, for example, the percentage of a current oxygen excess which can still be stored by first catalyst partial volume 26.1 and the greater the complementary percentage of the current oxygen excess which forms an input variable for the calculation of the fill level of second catalyst partial volume 26.2. The relative oxygen fill level (in %) in first catalyst partial volume 26.1 lying in front of it, relative to the maximum oxygen storage capacity of this first catalyst partial volume 26.1 and the development of this relative fill level, is therefore equally decisive for the development of the oxygen fill level in second catalyst partial volume 26.2 at the outlet of catalyst 26.

Values of the percentages and the maximum oxygen storage capacity are stored in control device 16 so that control device 16 can calculate both the fill level of first catalyst partial volume 26.1 and the fill level of second catalyst partial volume 26.2 from the exhaust gas mass flow known to said control device 16, a measured or modeled temperature of catalyst 26 and the predetermined and stored values for the percentages.

How the catalyst volume is ultimately filled with stored oxygen or emptied of stored oxygen largely depends on the exhaust gas temperature and the exhaust gas mass flow. In the case of a high exhaust gas temperature and low exhaust gas mass flow, the catalyst volume is in extreme cases gradually emptied or filled from the front to the rear, which means that initially first catalyst partial volume 26.1 is completely filled or emptied before the second catalyst partial volume is filled or emptied. In the case of a low exhaust gas temperature and large exhaust gas mass flow, the catalyst is in extreme cases filled or emptied simultaneously at the front and rear.

A check is performed in a step 104 as to whether the fill level of second catalyst partial volume 26.2 lies in a predefined interval with surrounds a setpoint value for the second fill level. If this is not the case, the program branches into step 106 in which an actuating variable for the lambda air ratio is determined as a function of a deviation of the actual fill level of the second catalyst partial volume from its setpoint value.

The actuating variable is, for example, a correction value for an actuating signal for the injection valves with which fuel is metered into the combustion chambers of the internal combustion engine. In order to increase the oxygen fill level, a lean fuel/air mixture (lambda>1) is set. In order to reduce the oxygen fill level, a rich fuel/air mixture (lambda<1) is set.

The method subsequently returns to main program 100 in which, among other things, the corrected actuation signals are formed and output. The loop of steps 100 to 106 is passed through repeatedly until the actual fill level of second catalyst partial volume 26.2 reaches its setpoint value. This is ascertained in step 104. In this case, the method branches from step 104 into a step 108. A check is performed in step 108 as to whether the fill level of first catalyst partial volume 26.1 lies in a predefined interval which surrounds a setpoint value for this first fill level. If this is not the case, the program branches into step 110 in which an actuating variable for the lambda air ratio is determined as a function of a deviation of the actual fill level of first catalyst partial volume 26.1 from its setpoint value.

The actuating variable is also, here, for example, a correction value for an actuation signal for the injection valves with which fuel is metered into the combustion chambers of the internal combustion engine. In order to increase the oxygen fill level, a lean fuel/air mixture (lambda>1) is set. In order to reduce the oxygen fill level, a rich fuel/air mixture (lambda<1) is set.

The method subsequently returns to main program 100 in which, among other things, the corrected actuation signals are formed and output. The loop of steps 100 to 104, 108 and 110 is passed through repeatedly until the actual fill level of the first catalyst partial volume reaches its setpoint value. This is ascertained in step 108. In this case, the method branches from step 108 back into main program 100 without forming a correction value.

FIG. 3 illustrates a control strategy which corresponds to the flow chart of FIG. 2 for the situation which is to be produced after a propulsion operation phase. In detail, FIG. 3 shows in its partial figures a) to e) in each case the fill level of both catalyst partial volumes 26.1, 26.2 in percent in the case of a control strategy with which initially the fill level in second catalyst partial volume 26.2 is adjusted so that the current emissions are minimized. To this end, the fill level of the second catalyst partial volume is, in the example under consideration, initially reduced from 100% according to FIG. 3 to 50% according to FIG. 3*d*. The initial fill level of 100% is produced, for example, in the case of a preceding propulsion operation phase with the fuel supply switched off.

The fill level is reduced by adjusting a rich exhaust gas atmosphere which has a lack of oxygen at the inlet of three-way catalyst 26. The control deviation formed as a difference between the actual value (100%) and setpoint value (50%) of second catalyst partial volume 26.2 is initially 50%. The rich exhaust gas atmosphere is generated by the injection of sufficiently large quantities of fuel into the combustion chambers of the internal combustion engine. In this case, the fill level of first catalyst partial volume 26.1 is reduced, in the example under consideration of FIG. 3*a* to FIG. 3*d*, gradually to zero, which is undesirable on the grounds mentioned above.

Later, preferably when the actual level of the fill level of second catalyst partial volume 26.2 has reached its setpoint value, in a further method step, the metering of fuel to combustion chambers 20 of internal combustion engine 10 is therefore reduced to such an extent that at the inlet of three-way catalyst 26 has a lean exhaust gas atmosphere having excess oxygen. Control is carried out to this end on the basis of a control deviation which is produced as the difference between the actual value of the fill level in first catalyst partial volume 26.1 and its setpoint value as long as the fill level of first catalyst partial volume 26.1 lies, for example, at half of the maximum fill level, i.e. at 50%. As a result of this, a maximum fill level reserve in first catalyst partial volume 26.1 is produced with which dynamic lambda disturbances, which can occur upstream of the catalyst volume, can be balanced out by discharging or absorbing oxygen.

This control strategy is based on the following observations: the oxygen fill level in a comparatively small rear catalyst partial volume at the outlet of the catalyst volume is decisive for the current exhaust gas composition behind a catalyst volume. As long as this catalyst partial volume can both store oxygen and release stored oxygen, both a reduction and an oxidation of exhaust gas components to be converted are possible and no breakthroughs of oxygen and other exhaust gas components arise.

The advantages of this procedure become clear as a result of the following comparison with other processes in the case of which control only of an oxygen fill level is carried out in a rear catalyst partial volume of the catalyst volume or in the case of which control to an average oxygen fill level of both catalyst partial volumes is carried out jointly.

A state is considered which is produced after a propulsion operation phase with the fuel supply switched off: in the propulsion operation phase, the internal combustion engine has pumped air into the exhaust gas system. The oxygen fill level of the catalyst volume then initially lies at 100%. A storage, required for conversion of nitrogen oxides, of further oxygen is then not possible. The stored oxygen should be cleared out to such an extent that the catalyst volume once again reaches its full conversion capacity as quickly as possible. To this end, a rich lambda is set before the catalyst volume. For the sake of simplicity, it is assumed that the exhaust gas temperature is high and the exhaust gas mass flow is low so that the oxygen store of the catalyst volume is gradually emptied from the front to the rear, that both partial volumes possess the same maximum oxygen storage capacity and that the setpoint fill level is in each case 50% of the maximum oxygen storage capacity of the catalyst.

In the case of a control which is only based on the actual value of the oxygen fill level in the rear catalyst partial volume, the control setpoint value of 50% is only reached when the catalyst volume has already been largely emptied of oxygen because the fill level in the rear catalyst partial volume only drops when the catalyst partial volume has been completely emptied before this. There is therefore the risk of a rich breakthrough as a result of the emptying of oxygen out of the catalyst volume, in particular if, under these conditions, a dynamic deviation of the lambda towards rich comes about before the catalyst volume.

In the case of control of the average oxygen fill level of the entire catalyst volume, the control setpoint value of 50% is reached as soon as the front half of the catalyst volume has been completely emptied and the rear half of the catalyst volume is still completely filled. In this case, the oxygen would not have been sufficiently emptied out of the catalyst volume, which would result in increased $NO_X$ emissions.

The adjustment according to the invention of at least two fill levels into a front and a rear catalyst partial volume makes it possible in this exemplary case to adjust both the fill level of the rear catalyst partial volume so that it lies in the conversion window and also adjust the fill level of the front catalyst partial volume so that the largest possible fill level reserve for dynamic deviations of the lambda in front of the catalyst volume towards rich or lean is achieved.

Due to the fact that the invention, in this situation which occurs after propulsion operation, initially empties the rear catalyst partial volume as quickly as possible to such an extent that, in this catalyst partial volume, oxygen can be both stored and released, the $NO_X$ emissions can be minimized. The front catalyst partial volume is nevertheless completely emptied. There is therefore the risk of rich breakthrough. According to the invention, the front catalyst partial volume is therefore subsequently filled again with oxygen to such an extent that a fill level reserve against dynamic deviations of the lambda before the catalyst is present both towards rich and towards lean.

In this case, it must of course be taken into account that the fill levels of both catalyst partial volumes are coupled and cannot be adjusted independently of one another. This example, which relates to a situation which occurs after a propulsion operation, represents an extreme case with the largest possible initial control deviation in the direction of an excessive fill level. It can, however, expediently be applied to situations with smaller control deviation or control deviation in the direction of an excessively low fill level. It can also be applied to situations in which only the fill level of individual zones deviates from the setpoint fill level (e.g. after a short propulsion operation phase).

In its most general form, the adjustment of a fill level profile of the catalyst volume is thus provided with the following steps: the fill level in a rear catalyst partial volume is set so that the current emissions are minimized. The fill level of one or more catalyst partial volumes lying in front of it is subsequently adjusted so that the fill level reserve against lambda disturbances in front of the catalyst volume is maximized. The coupling of the fill levels of the different catalyst partial volumes can be taken into account in the adjustment of the fill level profile. In particular, the dependency of this coupling on the catalyst temperature and on the exhaust gas mass flow can be taken into account. The setpoint fill levels of the catalyst partial volumes can be adapted dynamically to the current fill level distribution in the catalyst volume so that the two aims of the minimum current emissions and the maximum fill level reserve against dynamic disturbances are simultaneously satisfied as optimally as possible. In a situation in which currently no fill level reserve against dynamic disturbances is present, it can, for example, be expedient to accept, for a short time, higher emissions as a result of the increase in this fill level reserve in order as a result to ensure lower emissions in the long term.

The invention claimed is:

1. A method for adjusting a fuel/air ratio of an internal combustion engine (10) which has an exhaust gas system (14) with a single catalyst having a catalyst volume (26) which is capable of storing an exhaust gas component, the method comprising:
   determining a first actual fill level of the exhaust gas component for a first catalyst partial volume (26.1) of the catalyst volume (26) from operating parameters of the internal combustion engine (10) and the exhaust gas system (14) with a calculation model, wherein the first catalyst partial volume (26.1) extends in a direction of an exhaust gas flow across a front region of the catalyst volume (26);
   determining a second actual fill level of the exhaust gas component for a second catalyst partial volume (26.2) with the calculation model, wherein the second catalyst partial volume (26.2) extends downstream of the first catalyst partial volume (26.1) across a rear region of the catalyst volume (26);
   adjusting the fuel/air ratio based on a deviation of the second actual fill level from a second setpoint value; and
   adjusting the fuel/air ratio based on a deviation of the first actual fill level from a first setpoint value after adjusting the fuel/air ratio based on the deviation of the second actual fill level from the second setpoint value.

2. The method as claimed in claim 1, wherein the second setpoint value is predetermined so that emissions are minimized.

3. The method as claimed in claim 1, wherein the first setpoint value is predetermined so that a fill level reserve against changes in the fuel/air ratio which occur upstream in front of the catalyst volume assumes a predetermined value.

4. The method as claimed in claim 3, wherein the first setpoint value is half as large as a maximum fill level of the first catalyst partial volume (26.1) and that the second setpoint value is between 25% and 35% of the maximum oxygen storage capacity or of the maximum fill level of the second catalyst partial volume (26.2).

5. The method as claimed in claim 1, wherein an exhaust gas temperature and an exhaust gas mass flow are taken into account in the determination of the actual values of the fill levels.

6. The method as claimed in claim 1, wherein the single catalyst is a three-way catalyst.

7. The method as claimed in claim 1, wherein the exhaust gas component is oxygen.

8. A control device (16) for adjusting a fuel/air ratio of an internal combustion engine (10) which has an exhaust gas system (14) with a single catalyst having a catalyst volume (26) which is capable of storing an exhaust gas component, wherein the control device (16) is configured to
   determine a first actual fill level of the exhaust gas component for a first catalyst partial volume (26.1) of the catalyst volume (26) from operating parameters of the internal combustion engine (10) and the exhaust gas system (14) with a calculation model, wherein the first catalyst partial volume (26.1) extends in a direction of an exhaust gas flow across a front region of the catalyst volume (26);
   determine a second actual fill level of the exhaust gas component for a second catalyst partial volume (26.2) with the calculation model, wherein the second catalyst partial volume (26.2) extends downstream of the first catalyst partial volume (26.1) across a rear region of the catalyst volume (26);
   adjust the fuel/air ratio based on a deviation of the second actual fill level from a second setpoint value; and
   adjust the fuel/air ratio based on a deviation of the first actual fill level from a first setpoint value after adjusting the fuel/air ratio based on the deviation of the second actual fill level from the second setpoint value.

9. The control device (16) as claimed in claim 8, wherein the second setpoint value is predetermined so that emissions are minimized.

10. The control device (16) as claimed in claim 8, wherein the first setpoint value is predetermined so that a fill level reserve against changes in the fuel/air ratio which occur upstream in front of the catalyst volume assumes a predetermined value.

11. The control device (16) as claimed in claim 10, wherein the first setpoint value is half as large as a maximum fill level of the first catalyst partial volume (26.1) and that the second setpoint value is between 25% and 35% of the maximum oxygen storage capacity or of the maximum fill level of the second catalyst partial volume (26.2).

12. The control device (16) as claimed in claim 8, wherein an exhaust gas temperature and an exhaust gas mass flow are taken into account in the determination of the actual values of the fill levels.

13. The control device (16) as claimed in claim 8, wherein the single catalyst is a three-way catalyst.

14. The control device (16) as claimed in claim 8, wherein the exhaust gas component is oxygen.

* * * * *